United States Patent

Herrmann

(10) Patent No.: US 6,517,163 B2
(45) Date of Patent: Feb. 11, 2003

(54) FORCE DEFLECTION DEVICE FOR ADAPTING A SEATBELT

(75) Inventor: Michael Herrmann, Cologne (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,819

(22) Filed: Oct. 22, 2001

(65) Prior Publication Data

US 2002/0047299 A1 Apr. 25, 2002

(30) Foreign Application Priority Data

Oct. 25, 2000 (EP) .......................................... 00123104

(51) Int. Cl.[7] .............................................. B60R 22/10
(52) U.S. Cl. ...................... 297/467; 297/253; 297/485
(58) Field of Search ................................. 297/253, 467, 297/468, 485

(56) References Cited

U.S. PATENT DOCUMENTS

| 2,877,833 A | * | 3/1959 | Boles ............................ 297/253 |
| 3,385,633 A | | 5/1968 | Aizley |
| 4,093,307 A | | 6/1978 | McLennan |
| 5,005,865 A | * | 4/1991 | Kruse ............................ 297/467 |
| 5,257,854 A | | 11/1993 | Korneliussen |
| 5,352,024 A | * | 10/1994 | Grene ............................ 297/467 |
| 5,624,136 A | | 4/1997 | McGlothlin et al. |
| 5,641,254 A | * | 6/1997 | Sullivan ........................ 297/253 |

FOREIGN PATENT DOCUMENTS

EP          0-675-028 A     10/1995

* cited by examiner

Primary Examiner—Peter R. Brown
(74) Attorney, Agent, or Firm—Frank A. MacKenzie

(57) ABSTRACT

A force deflection device (1) is disclosed for adapting a lap strap to enhance the comfort of the wearer and optimize the introduction of forces for use by pregnant women and the overweight, comprising a force deflection strap (6) with a first end, which is to be attached to the lap strap, and a second end, which is to be passed through the gap between the seat cushion and the seat back and to be attached to the seat. This second end of the force deflection strap (6) has attached to it a fixing element (2), which is preferably plate-shaped, that cannot pass through said gap in a transverse position relative to the seat. The fixing element (2) can be attached to the rear side of the seat back by means of a hook and loop fastener (3). At its first end, the force deflection strap (6) preferably has a hook (4) and eyes (5) that can be hooked into the latter, allowing it to be looped around the lap strap.

4 Claims, 1 Drawing Sheet

FORCE DEFLECTION DEVICE FOR ADAPTING A SEATBELT

BACKGROUND OF INVENTION

The invention relates to a force deflection device for adapting a lap strap for use by pregnant women and the overweight, comprising a force deflection strap with a first end, which is to be attached to the lap strap, and a second end, which is to be passed through the gap between the seat cushion and the seat back and to be attached to the seat.

Conventional safety belts in aircraft, motor vehicles or the like comprise a lap strap that runs from one side of the seat to the other in front of the pelvis or abdomen of the user. If high braking acceleration occurs, in the event of a collision for instance, the lap strap restrains the person secured in the seat, exerting the restraining force predominantly on the pelvic and abdominal areas of the user. This mode of exerting force can be unfavorable in certain situations.

U.S. Pat. No. 5,624,136 has disclosed a force deflection device in which an attempt is made to adapt the path of and the introduction of force by a conventional lap strap by diverting the restraining forces of the strap system away from the abdomen of the user and directing them more strongly toward the thighs. A system of this kind is therefore particularly suitable for use by pregnant women. The force deflection device comprises a force deflection strap, the first end of which is attached to the lap strap by means of a snap fastener and the second end of which is to be fixed on a rigid part of the frame or on seat springs underneath the seat cushion with the aid of a hook and loop fastener. Fixing the second end in this way is very involved. If there are no suitable points of attachment on the underside of the seat cushion, this may mean that the chosen way of attaching the force deflection strap does not offer adequate strength when the strap is used or that the substructure of the seat cushion is damaged. Another disadvantage of the method of attachment mentioned is that, when not in use, the force deflection strap tends to fall on the floor, from where it has to be picked up again when putting the strap on. However, it is precisely the target user groups for the device for whom this will often not only be troublesome but virtually impossible.

European Patent No. 0,675,028 B1 has disclosed a safety belt system that is likewise designed specifically for use by pregnant women. The lap strap provided in this system is pulled away from the abdomen and between the thighs by means of a force deflection strap attached to it, the second end of the force deflection strap being passed through the gap between the seat cushion and the seat back. On the rear side of the seat, the second end of the force deflection strap is attached to a transverse strap system, the two ends of this strap system being screwed to the left-hand and right-hand sides of the seat. The disadvantage with this solution is that a completely new strap system has to be fitted, with the standard belt being unused and having to be hidden under an additional seat cover, for example. Moreover, the attachment of the force deflection strap at two points to the side of the seat is very involved and entails undoing or refastening screwed joints. For many users, mounting such a strap system will require using a workshop, which is associated with corresponding costs and will probably reduce the willingness to use the strap that would be desirable in terms of the safety aspects.

SUMMARY OF INVENTION

Faced with this situation, it is the object of the present invention to improve a force deflection device of the type stated at the outset in such a way that it can be used more easily and produced more cheaply.

In accordance with the objects of this invention, a force deflection device for adapting a seatbelt is provided. The invention relates to a force deflection device for adapting a lap strap to enhance the comfort of the wearer and optimize the introduction of forces for use by pregnant women and the overweight, comprising a force deflection strap with a first end, which is to be attached to the lap strap, and a second end, which is to be passed through the gap between the seat cushion and the seat back and to be attached to the seat. This second end of the force deflection strap has attached to it a fixing element, which is preferably plate-shaped, that cannot pass through said gap in a transverse position relative to the seat. The fixing element can be attached to the rear side of the seat back by means of a hook and loop fastener. At its first end, the force deflection strap preferably has a hook and eyes that can be hooked into the latter, allowing it to be looped around the lap strap.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

Figure 1:
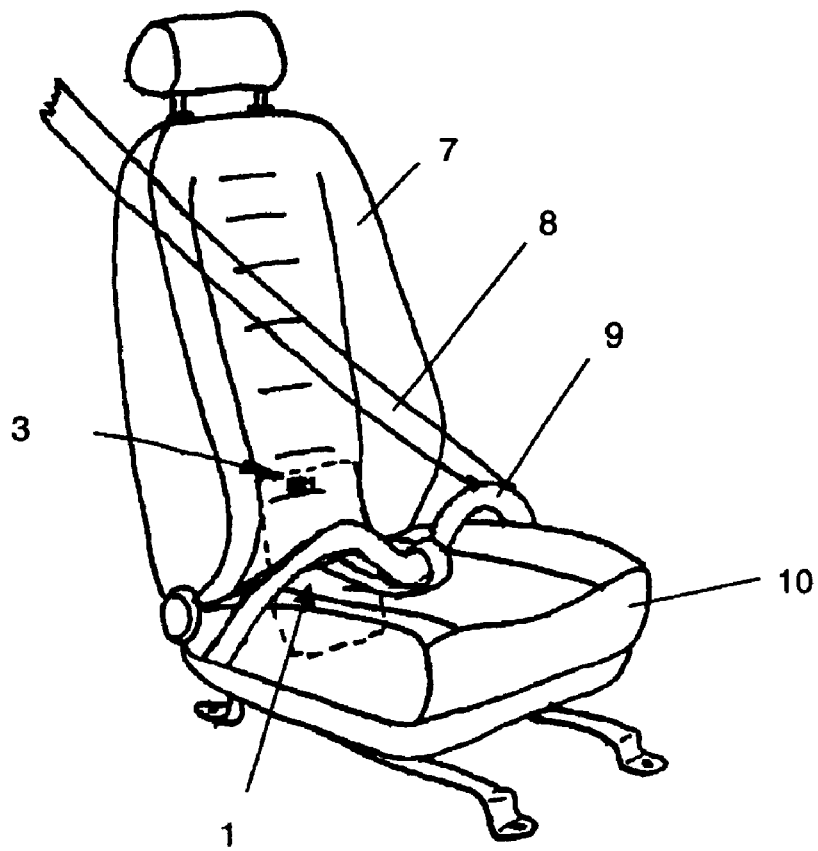
FIG. 1 shows the seat of a motor vehicle with a safety belt system and the force deflection device according to the invention.

In the following figures, the same reference numerals will be used to identify identical components in the various views. The present invention is illustrated with respect to a force deflection device for adapting a seatbelt, particularly suited for the automotive field. However, the present invention is applicable to various other uses that may require a force deflection device for adapting a seatbelt.

The force deflection device is used to adapt the path of and the introduction of force by the lap strap of a safety belt system for use, in particular, of pregnant women and the overweight, and the safety belt system can preferably be installed in a motor vehicle or aircraft. The force deflection device comprises a force deflection strap with a first end, which is to be attached to the lap strap to be adapted, and a second end, which is to be passed through the gap between the seat cushion and the seat back of the seat and to be attached to the seat. The force deflection device is distinguished by the fact that the second end of the force deflection strap has attached to it a fixing element, this fixing element being designed in such a way that it cannot pass through the gap between the seat cushion and the seat back, at least in one orientation relative to the seat.

The arrangement, in accordance with the invention, of the fixing element on the second end of the force deflection strap ensures a means of fixing the force deflection strap on the seat that is particularly easy to use and, at the same time, can be produced cheaply. This fixing is accomplished by passing the force deflection strap through the gap between the seat cushion and the seat back to the front side of the seat, while its end attached to the fixing element remains on the rear side of the seat. There, the fixing element is in the orientation relative to the seat in which it cannot pass through the gap.

There are no special requirements on the design of the seat for the production of the fixing, in accordance with the invention, of the force deflection strap: in particular, there is no need for the presence of and access to frame structures for the attachment of the force deflection strap, and there is also no need to undo screwed connections or to use them to fix the additional strap. The economical production and particularly simple fitting of the force deflection device will encourage wide use, which is desirable in terms of the safety aspects.

According to a preferred refinement of the fixing element, it is plate-shaped, the second end of the force deflection strap being attached approximately in the center of the area of this plate. A fixing plate of this kind positions itself automatically transversely to the force deflection strap when tensile loading is applied to the strap and, as a result, it comes to rest with its full area against the rear side of the seat. In this orientation, the fixing plate is transverse to the gap between the seat cushion and the seat back, with the result that it cannot pass through the gap. At the same time, a plate-shaped fixing element has the advantage that, when required, it can also be pushed end first through the gap between the seat cushion and the seat back, facilitating fitting and removal of the force deflection device.

The fixing element preferably has at least one releasable fastening means, by means of which the fixing element can be attached to the seat, in particular to the rear side of the seat back. When in use, the fixing element is fixed in its position owing to the tensile loading on the force deflection strap. Thanks to the fastening means, this fixing of the position of the fixing element in place is retained even when the seat belt is not being used and there is therefore no tensile loading the force deflection strap. Since the fastening means has merely to hold the fixing element in place, it need only be designed for low force loads. In particular, the fastening means can be formed by a hook and loop fastener, it frequently being possible to hook the hook side of such a hook and loop fastener into the textile fabric of a seat without special measures.

There are various possibilities for the design of the first end of the force deflection strap, which is to be attached to the lap strap. A hook and at least one eye are preferably arranged on this end, it being possible to hook the eye into the hook by forming a loop in the force deflection strap, this loop being passed around the lap strap. In this way, the force deflection strap can be attached to the lap strap in a particularly simple manner after the conventional safety belt system has been put on.

FIG. 1 shows a motor-vehicle seat comprising a seat back 7 and a seat cushion 10. It also shows the path of the shoulder strap 8 and the lap strap 9 of a conventional (3-point) safety belt, but does not show the details, known per se, of the attachment and length adjustment of a belt system of this kind.

The path of the lap strap 9 shown in FIG. 1 illustrates the action of a force deflection device 1 according to the invention. This action consists in pulling downward and rearward the central part of the lap strap 9, which, when in use, lies between the thighs of a person (not shown) sitting on the seat. The lap strap 9 is therefore pulled away from the person's abdomen and the forces introduced via the lap strap 9 act primarily on the thighs, in a manner similar to that in the case of a parachutist's harness.

Figure 2:
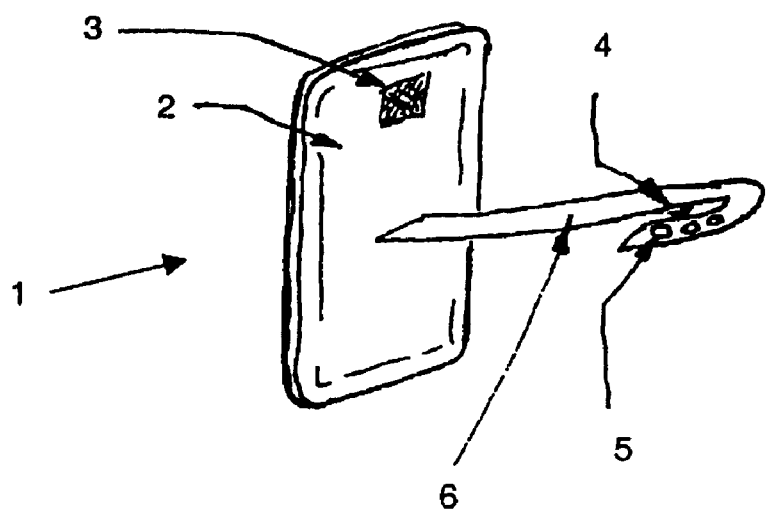
FIG. 2 shows a perspective view of the force deflection device.

In FIG. 2, the force deflection device 1 according to the invention is shown separately in perspective. The device comprises a force deflection strap 6, the first end of which (on the right in FIG. 2) is to be attached to the lap strap 9 (FIG. 1). In the example, a hook 4 and eyes 5 arranged between the hook 4 and the end of the force deflection strap 6 are provided to allow this end to be attached to the lap strap 9. This end of the force deflection strap can thus be looped around the lap strap 9 and the eyes are hooked into the hook 4, the length of the loop being adapted through the choice of eye 5. The force deflection strap 6 can thus be attached to the lap strap 9 and adjusted in length in a simple manner to correct the path of this lap strap in the desired manner after the standard belt has been put on.

A fixing element in the form of a fixing or holding plate 2 is attached to the first end (the left-hand end in FIG. 2) of the force deflection strap 6. The second end of the force deflection strap 6 is attached approximately at the center of this plate, e.g. by being tied to a web (not shown) with a knot. As can be seen from FIG. 1, the fixing plate 2 positions itself transversely in front of the gap between the seat back 7 and the seat cushion 10 on the rear side of the seat, with the result that it holds the second end of the force deflection belt 6 firmly on the rear side of the seat. By appropriate dimensioning of the fixing element 2, it is possible to ensure that the tensile force transmitted to the fixing element by the force deflection strap 6 is distributed over a large area and can therefore be accepted without problems by the rear side of the seat.

On its upper side, the side facing the rear side of the seat back 7, the fixing plate 2 has a hook and loop fastener 3, with the aid of which the fixing plate can be attached to the seat. Since forces are not actually accepted via this hook and loop fastener 3 during force deflection from the lap strap, it being rather merely a matter of holding the fixing plate 2 in its position, attachment at one point with the aid of a hook and loop fastener is sufficient. It prevents the fixing plate 2 moving out of position when not in use, when there is no tensile loading on the force deflection strap 6, and hanging or lying in the foot well behind the seat in such a way as to be a nuisance.

From the foregoing, it can be seen that there has been brought to the art a new and improved force deflection device for adapting a seatbelt. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A force deflection device for adapting a lap strap for use by pregnant women and the overweight, comprising:
   a force deflection strap with a first end, which is to be attached to the lap strap and a second end, which is to be passed through a gap between a seat cushion and a seat back and to be attached to a seat;
   wherein the second end of the force deflection strap has attached to it a fixing element that cannot pass through the gap between the seat cushion and the seat back, at least in one orientation relative to the seat;
   wherein the fixing element has releasable fastening means, preferably in the form of a hook and loop fastener, for attachment to the seat, preferably to the rear side of the seat back.

2. The force deflection device according to claim 1, wherein the fixing element is plate-shaped, and wherein the second end of the force deflection strap is attached approximately in the center of the fixing element.

3. The force deflection device according to claim 2, wherein the first end of the force deflection strap has a hook and at least one eye, allowing the force deflection strap to be placed around the lap strap, thereby forming a loop, and the eye to be hooked into the hook.

4. The force deflection device according to claim 1, wherein the first end of the force deflection strap has a hook and at least one eye, allowing the force deflection strap to be placed around the lap strap, thereby forming a loop, and the eye to be hooked into the hook.

* * * * *